United States Patent
Kawai (10) Patent No.: US 9,657,602 B2
(45) Date of Patent: May 23, 2017

(54) EXHAUST HEAT RECOVERY DEVICE FOR INTERNAL COMBUSTION ENGINE AND EXHAUST HEAT RECOVERY METHOD FOR INTERNAL COMBUSTION ENGINE

(71) Applicant: ISUZU MOTORS LIMITED, Tokyo (JP)

(72) Inventor: Kazuo Kawai, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 144 days.

(21) Appl. No.: 14/441,872

(22) PCT Filed: Dec. 10, 2013

(86) PCT No.: PCT/JP2013/083012
§ 371 (c)(1),
(2) Date: May 11, 2015

(87) PCT Pub. No.: WO2014/097923
PCT Pub. Date: Jun. 26, 2014

(65) Prior Publication Data
US 2015/0275698 A1 Oct. 1, 2015

(30) Foreign Application Priority Data
Dec. 17, 2012 (JP) ................................. 2012-274646

(51) Int. Cl.
| | |
|---|---|
| F01K 23/10 | (2006.01) |
| F01K 23/06 | (2006.01) |
| F02G 5/02 | (2006.01) |
| F01K 3/10 | (2006.01) |
| F01K 11/02 | (2006.01) |
| F01K 17/04 | (2006.01) |

(Continued)

(52) U.S. Cl.
CPC .............. *F01K 23/065* (2013.01); *F01K 3/10* (2013.01); *F01K 11/02* (2013.01); *F01K 17/04* (2013.01);
(Continued)

(58) Field of Classification Search
CPC .......... F01K 23/065; F01K 3/10; F01K 11/02; F01K 17/04; F01K 23/101; F02G 5/02; F01N 5/02; Y02T 10/166
(Continued)

(56) References Cited

U.S. PATENT DOCUMENTS 2,919,540 A * 1/1960 Percival .................... F02G 5/02
60/39.55
4,164,848 A 8/1979 Gilli et al.
(Continued)

FOREIGN PATENT DOCUMENTS

| | | |
|---|---|---|
| CN | 102182583 | 9/2011 |
| CN | 102691555 | 9/2012 |

(Continued)

OTHER PUBLICATIONS

International Search Report mailed on Mar. 11, 2014 in corresponding International Patent Application No. PCT/JP2013/083012.

*Primary Examiner* — Thai Ba Trieu
(74) *Attorney, Agent, or Firm* — Staas & Halsey LLP (57) ABSTRACT

An exhaust heat recovery device for an engine including a Rankine cycle, including a steam accumulator that stores a surplus of a working medium for driving a turbine, and a leveling line that discharges the stored surplus working medium from the steam accumulator to the turbine, when the turbine cannot output predetermined power only with the working medium flowing out from a boiler, and levels the power outputted from the turbine. Since the power outputted from the turbine can be leveled without reduction of the power, even if the working medium cannot vaporize with the boiler immediately after start-up, immediately before stop, or during a low-load operation of the engine, exhaust heat from the engine can be efficiently used.

6 Claims, 8 Drawing Sheets

(51) Int. Cl.
*F02B 37/00* (2006.01)
*F01N 5/02* (2006.01)

(52) U.S. Cl.
CPC .......... *F01K 23/101* (2013.01); *F02B 37/004* (2013.01); *F02G 5/02* (2013.01); *F01N 5/02* (2013.01); *Y02T 10/166* (2013.01)

(58) Field of Classification Search
USPC .......................................................... 60/618
See application file for complete search history.

(56) References Cited

U.S. PATENT DOCUMENTS

| | | | |
|---|---|---|---|
| 5,148,668 A | | 9/1992 | Frutschi |
| 5,241,817 A | | 9/1993 | George, Jr. |
| 5,269,145 A | | 12/1993 | Krause et al. |
| 5,806,332 A | * | 9/1998 | Shea, Sr. ................. F02B 63/04 60/618 |
| 6,910,333 B2 | * | 6/2005 | Minemi .................. F01B 17/04 60/618 |
| 2012/0291418 A1 | | 11/2012 | Rusche |
| 2013/0192225 A1 | | 8/2013 | Rewers et al. |
| 2015/0013335 A1 | * | 1/2015 | Carstensen ............... F02G 5/02 60/618 |

FOREIGN PATENT DOCUMENTS

| | | |
|---|---|---|
| JP | 58-20911 | 2/1983 |
| JP | 5-296005 | 11/1993 |
| JP | 2010-196476 | 9/2010 |
| JP | 2012-7500 | 1/2012 |

\* cited by examiner

EXHAUST HEAT RECOVERY DEVICE FOR INTERNAL COMBUSTION ENGINE AND EXHAUST HEAT RECOVERY METHOD FOR INTERNAL COMBUSTION ENGINE

CROSS-REFERENCE TO RELATED APPLICATIONS

This application is a U.S. National Stage Application, which claims the benefit under 35 U.S.C. §371 of PCT International Patent Application No. PCT/JP2013/083012, filed Dec. 10, 2013, which claims the foreign priority benefit under 35 U.S.C. §119 of Japanese Patent Application No. 2012-274646, filed Dec. 17, 2012, the contents of which are incorporated herein by reference.

TECHNICAL FIELD

The present invention relates to an exhaust heat recovery device for an internal combustion engine and an exhaust heat recovery method for the internal combustion engine, in which exhaust heat from the internal combustion engine is collected and is used as driving power for the internal combustion engine, or electric power generation.

BACKGROUND ART

Conventionally, a Rankine cycle has been used as one method for collecting and using exhaust heat energy dissipated into the atmosphere through exhaust gas or cooling water of an internal combustion engine. This Rankine cycle is a type of irreversible heat cycle as well as a theoretical cycle with a steam turbine, and includes a pump that pressure-feeds a working medium, a boiler (evaporator) that vaporizes the working medium with exhaust heat from an engine, a turbine (expander) that is driven with the working medium flowing out from the boiler to output power, and a condenser that liquefies the working medium flowing out from the turbine.

There is proposed a technique in which this Rankine cycle is provided to an automobile; water, ethyl alcohol with a low boiling point, a mixture of water and ethyl alcohol, or a chlorofluorocarbon substitute gas (for example, HFC134a, HFC245fa, or HFO1234yf) is used as the working medium; exhaust heat energy from an engine (internal combustion engine) is recovered; changes in volume at the time of vaporization are converted into power; and this power is used as assistance with an output of shaft from the engine or for generating electric power.

There is proposed a device having a Rankine cycle provided to an automobile, which includes: an evaporator that exchanges heat between an exhaust gas recirculation (EGR) gas and a working medium; a superheater that exchanges heat between the working medium flowing out from the evaporator and exhaust flowing out from a turbo charger; and an expander that is driven with the working medium flowing out from the superheater, and whereby recovers exhaust heat from the internal combustion engine (see, for example, Patent Literature 1). With this configuration, in the internal combustion engine including the turbo charger and an EGR system, exhaust heat loss is efficiently recovered, and is regenerated as power, thereby further improving thermal efficiency.

However, the output of power from the Rankine cycle uses exhaust heat from the engine, and depends on a state of operation of the engine. Thus, it is not possible to stably output the power in a state where exhaust heat energy is low, for example, immediately after the engine has started, immediately before the engine stops, or during a low-load operation, and an effect thereof on a practical fuel efficiency is merely several percents.

Meanwhile, there is a device having a steam accumulator as well as the Rankine cycle (see, for example, Patent Literature 2 and Patent Literature 3).

A device described in Patent Literature 2 accumulates steam in a steam accumulator during normal operation, stops a main engine during idling operation, and discharges steam from the steam accumulator to drive the Rankine engine, thereby resuming the main engine with the Rankine engine. With this configuration, fuel efficiency is improved in driving where the engine frequently performs the idling operation.

Furthermore, a device described in Patent Literature 3 performs regenerative power assist using regenerative power during fuel cut for an engine at the time of speed reduction, thereby suppressing an increase in the vehicle deceleration caused by auxiliary machine regeneration. With this configuration, the amount of regeneration with the auxiliary machine is increased, whereby fuel efficiency is improved. Furthermore, the steam accumulator is used to delay a timing of generating the regenerative power, whereby the regenerative power assist starts at a time when the vehicle deceleration reaches an allowable deceleration. Thus, it is possible to prevent excessive deceleration while achieving an appropriate sense of speed reduction at the beginning of speed reduction, which makes it possible for a driver to feel a natural speed reduction.

These devices store, in the steam accumulator, the exhaust heat energy from the engine, and control timings of outputting power so as to output the power when needed, thereby achieving an improvement in fuel efficiency. However, with these devices, the amount of exhaust heat energy that can be used is limited to the amount of the exhaust heat energy that the steam accumulator can store, and hence, the exhaust heat energy from the engine cannot be efficiently used. In addition, if the capacity of the steam accumulator is increased, mountability to a vehicle deteriorates accordingly.

PRIOR ART DOCUMENTS

Patent Document 1: Japanese patent application Kokai publication No. 2012-007500
Patent Document 2: Japanese patent application Kokai publication No. S58-20911
Patent Document 3: Japanese patent application Kokai publication No. 2010-196476

SUMMARY OF THE INVENTION

The present invention has been made in view of the problems described above, and an object of the present invention is to provide an exhaust heat recovery device for an internal combustion engine and an exhaust heat recovery method for an internal combustion engine, which can level power outputted from an expander without reduction of the power even in the case where an evaporator cannot vaporize a working medium, for example, immediately after start-up and immediately before stop, or during a low-load operation of an internal combustion engine, and whereby can efficiently use the exhaust heat from the internal combustion engine.

To solve the object described above, an exhaust heat recovery device for an internal combustion engine according to the present invention has a Rankine cycle including:

a pump that pressure-feeds a working medium;

an evaporator that vaporizes the working medium with exhaust heat from the internal combustion engine;

an expander that is driven with the working medium flowing out from the evaporator, and outputs power; and a condenser that liquefies the working medium flowing out from the expander, a steam accumulator that stores a surplus working medium, which is a surplus of the working medium for driving the expander; and a leveling line that discharges the stored surplus working medium from the steam accumulator to the expander when the expander cannot output predetermined power only with the working medium flowing out from the evaporator, and levels the power outputted from the expander.

With this configuration, the leveling line that levels the output of the power when the expander cannot output predetermined power only with a working medium flowing out from an evaporator is provided, and a surplus working medium is discharged from the steam accumulator to drive the expander even in the case where the evaporator cannot vaporize a working medium, for example, immediately after start-up and immediately before stop, or during a low-load operation of an internal combustion engine. This makes it possible to prevent a reduction in power, and to level the power outputted by the expander, whereby it is possible to efficiently use exhaust heat from the internal combustion engine. Furthermore, by using the leveled power to drive the internal combustion engine, it is possible to improve fuel efficiency.

It should be noted that the expression "leveling" as used herein means that the timing for the expander to drive is made earlier in the case of the internal combustion engine which is immediately after the engine has started, and the period of time for the expander to drive is extended in the case of the internal combustion engine which is immediately before stopping or at the time when the internal combustion engine operates with a low load. Furthermore, as for regeneration of the power outputted by the expander, it is possible to employ a configuration in which a power generation system with one line of expander, or a power generation system with two lines of expanders for high pressure and low pressure is used, and electric energy obtained through the power generation system is used for a crankshaft (output shaft) of an internal combustion engine through an electrically driven motor, or a configuration in which rotation of the expander is regenerated directly for the crankshaft of the internal combustion engine, for example, by way of a speed reducer, a speed increasing device, or a continuously variable transmission.

Furthermore, the exhaust heat recovery device for an internal combustion engine described above includes:

a normal power output flow path that guides, to the expander, the working medium flowing out from the evaporator;

a storage flow path that guides, to the steam accumulator, the working medium flowing out from the evaporator;

a leveling flow path that guides, to the expander, the working medium flowing out from the steam accumulator; and a control device including:

a storage unit configured to open the storage flow path to store the surplus working medium in the steam accumulator when, after the normal power output flow path is opened and the expander is driven with the working medium flowing out from the evaporator, a temperature or pressure of the working medium flowing out from the evaporator exceeds a surplus judgment value at which the surplus working medium is generated, and a leveling unit configured to open the leveling flow path to discharge the surplus working medium stored in the steam accumulator to the expander, and levels the power outputted from the expander when a temperature or pressure of the working medium flowing out from the evaporator falls below a leveling judgment value at which the expander cannot output predetermined power only with the working medium flowing out from the expander. With this configuration, it is possible to choose from outputting the power only with the Rankine cycle, outputting the power with the Rankine cycle and storing a surplus thereof in the leveling line, and operating the leveling line to prevent a reduction in output of power according to a temperature or pressure of the working medium, whereby it is possible to level the output of power.

It should be noted that, in the case of an expander having one line, the leveling flow path is configured to merge with the normal power output flow path on the upstream side of the expander. In the case of an expander having two lines of high and low pressure, the normal power output flow path is connected with the high-pressure expander, the leveling flow path is connected with the low-pressure expander, and these are configured to merge with each other on the downstream side of the expander and the upstream side of the condenser.

In addition, in the exhaust heat recovery device for an internal combustion engine described above, the steam accumulator is configured to include a heat storage tube having both ends closed and having a heat storage material enclosed therein, this heat storage material melting at a temperature of not less than 80° C. and not more than 150° C. With this configuration, an effect of latent heat and heat storage is given in addition to a configuration of storing pressure that a normal accumulator has and a configuration of storing heat with sensible heat of a working medium. Thus, it is possible to reduce the size while maintaining the same heat capacity, and suppress an increase in weight. This makes it possible to improve mountability to vehicles.

Furthermore, in order to solve the object described above, an exhaust heat recovery method for an internal combustion engine according to the present invention uses a Rankine cycle including:

a pump that pressure-feeds a working medium;

an evaporator that vaporizes the working medium with exhaust heat from the internal combustion engine;

an expander that is driven with the working medium flowing out from the evaporator, and outputs power; and a condenser that liquefies the working medium flowing out from the expander, the method including:

storing, in a steam accumulator, a surplus working medium which is a surplus of the working medium for driving the expander;

discharging the stored surplus working medium from the steam accumulator to the expander when the expander cannot output predetermined power only with the working medium flowing out from the evaporator; and leveling the power outputted from the expander.

Furthermore, in the exhaust heat recovery method for an internal combustion engine described above, it is preferable to include the steps of:

opening a storage flow path that guides the working medium flowing out from the evaporator to the steam accumulator to store the surplus working medium in the steam accumulator when, after a normal power output flow path that guides the working medium flowing out from the evaporator to the expander is opened and the expander is driven with the working medium flowing out from the evaporator, a temperature or pressure of the working medium flowing out from the evaporator exceeds a surplus judgment value at which the surplus working medium is generated, and opening a leveling flow path that guides the working medium flowing out from the steam accumulator to the expander to discharge the stored surplus working medium from the steam accumulator to the expander, and leveling the power outputted from the expander when a temperature or pressure of the working medium flowing out from the evaporator falls below a leveling judgment value at which the expander cannot output predetermined power only with the working medium flowing out from the expander.

According to the present invention, it is possible to level the power outputted from the expander without reduction of the power even in the case where the evaporator cannot vaporize the working medium, for example, immediately after start-up and immediately before stop, or during a low-load operation of an internal combustion engine, whereby it is possible to efficiently use exhaust heat from the internal combustion engine. Furthermore, by using the power, for example, as assistance in driving the internal combustion engine, it is possible to improve fuel efficiency of the internal combustion engine.

DETAILED DESCRIPTION

Hereinbelow, an exhaust heat recovery device for an internal combustion engine and an exhaust heat recovery method for an internal combustion engine according to an exemplary embodiment of the present invention will be described with reference to the drawings. Note that dimensions in the drawings are changed so that configurations are easily recognized, and ratios of thicknesses, widths, lengths, or other dimensions of each member and each part are not always equal to those actually manufactured.

In the following exemplary embodiment, description will be made by using a diesel engine as an example. However, application of the present invention is not limited to the diesel engine, and can be applied also to a gasoline engine. Furthermore, the number of cylinders or arrangement of cylinders is not limited. An engine 1 illustrated in FIG. 1 to FIG. 4, and FIG. 7 is configured such that exhaust gas emitted from an engine main body 2 is discharged from an exhaust manifold 3 to the outside by way of a turbo charger 4, and air taken in with the turbo charger 4 passes through cooling with an air cooler 5 and is delivered to an intake manifold 6. Furthermore, part of the exhaust gas passes through an exhaust gas recirculation ("EGR") cooler 7 and circulates from an EGR valve 8 to the intake manifold 6. In addition, cooling water, which cools the engine main body 2 and the EGR cooler 7 and becomes high temperature, passes through a valve 10, is delivered to a radiator 11, is cooled with a cooling fan 12 and is recirculated via a valve 9.

Figure 1:
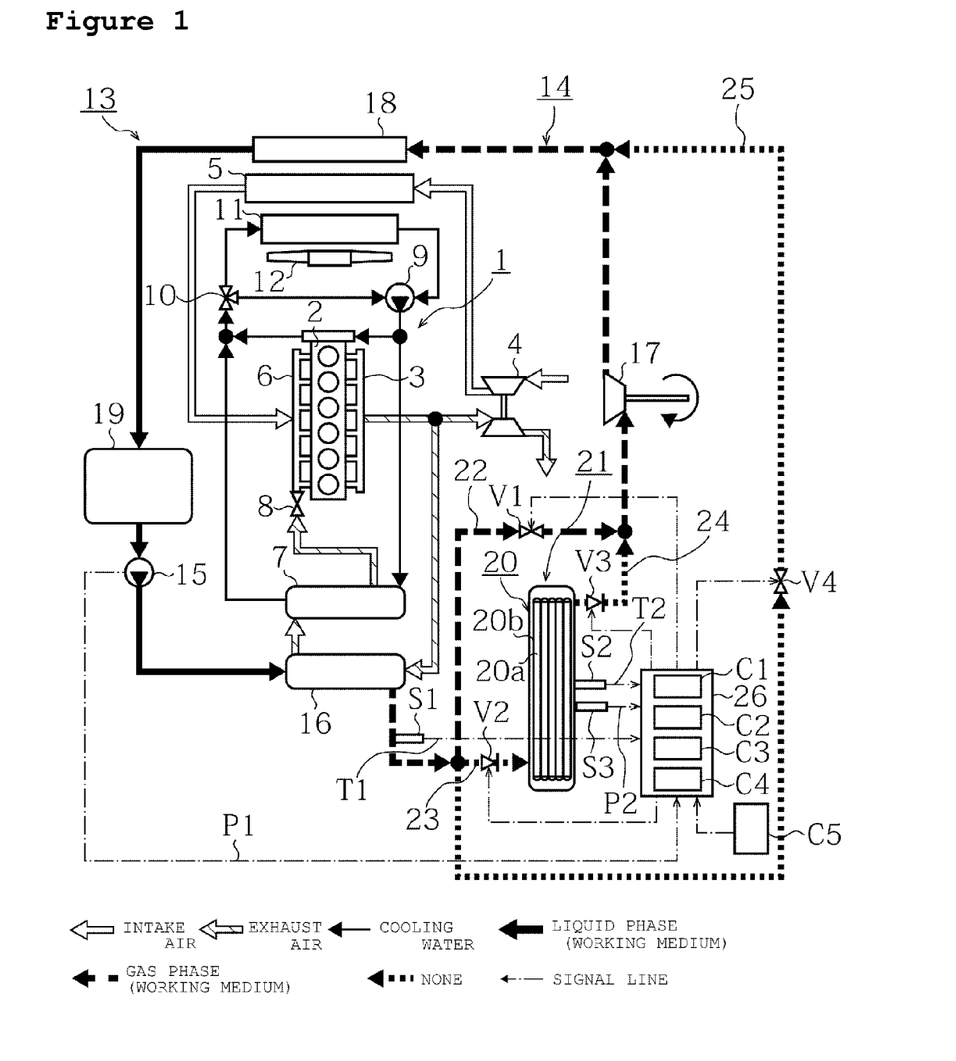
FIG. 1 is a diagram illustrating a configuration of an exhaust heat recovery device for an internal combustion engine according to a first exemplary embodiment of the present invention, and illustrating a state where a normal power output flow path is opened to output power through a Rankine cycle.

FIG. 1, illustrates an exhaust heat recovery device 13 for an internal combustion engine according to a first exemplary embodiment of the present invention, which recovers and uses exhaust heat from the engine 1, and includes a Rankine cycle 14. The Rankine cycle 14 includes a working medium pump (pump) 15, a boiler (evaporator) 16, a turbine (expander) 17, a condenser 18, and a receiver tank (storage tank) 19. Furthermore, the turbine 17 is connected with an electric power generator, not illustrated, and outputs power (electric power).

In order to level the output of power with the turbine 17 to efficiently use exhaust heat from the engine 1, the present invention not only includes the Rankine cycle 14, but also includes a steam accumulator 20 that stores a surplus working medium, which is a surplus of a working medium for driving the turbine 17, and a leveling line 21 that discharges the stored surplus working medium from the steam accumulator 20 to the turbine 17 when the turbine 17 cannot output predetermined power only with a working medium flowing out from the boiler 16, and levels the power outputted from the turbine 17.

More specifically, the present invention includes a normal power output flow path 22 that guides the working medium flowing out from the boiler 16 to the turbine 17, a storage flow path 23 that guides the working medium flowing out from the boiler 16 to the steam accumulator 20, a leveling flow path 24 that guides the working medium flowing out from the steam accumulator 20 to the turbine 17, and a bypass flow path 25 that causes the working medium flowing out from the boiler 16 to bypass both the turbine 17 and the steam accumulator 20, and guides the working medium flowing out from the boiler 16 to the condenser 18.

Furthermore, the present invention includes an electronic control unit (ECU) (control device) 26 including a normal power output unit C1, a storage unit C2, a leveling unit C3, and a bypass unit C4 that acquire a temperature T1 and pressure P1 of the working medium flowing out from the boiler 16 and a temperature T2 and pressure P2 of the surplus working medium in the steam accumulator 20, and open/close the normal power output flow path 22, the storage flow path 23, the leveling flow path 24, and the bypass flow path 25, respectively.

In addition, the normal power output flow path 22, the storage flow path 23, the leveling flow path 24, and the bypass flow path 25 include a first valve V1, a second valve V2, a third valve V3, and a fourth valve V4, respectively. Furthermore, there are provided a temperature sensor S1 that detects a temperature T1 of the working medium flowing out from the boiler 16, a temperature sensor S2 that detects a temperature T2 in the steam accumulator 20, and a pressure sensor S3 that detects pressure P2 in the steam accumulator 20.

As for the Rankine cycle 14, although a known technique of Rankine cycle can be used, it is preferable to employ a Rankine cycle called an organic Rankine cycle (also called ORC) or binary fluid cycle, which works with a low-temperature heat source at 150° C. or lower, because this technique can output power even when the engine 1 operates with a low load. As for the working medium in the Rankine cycle 14 that works with the low-temperature heat source, it is preferable to employ a working medium having a boiling point lower than water, and it is possible to use, for example, ammonia (boiling point: −33.34° C.), ethyl alcohol (boiling point: 78.37° C.), and chlorofluorocarbon substitute gas (HFC134a: boiling point of −26.2° C., HFC245fa: boiling point of 15.3° C., HFO1234yf: boiling point of −29.4° C.).

A known pump can be used for the working medium pump 15. In this exemplary embodiment, the working medium pump 15 is connected with the ECU 26 and transmits the number of revolutions to the ECU 26, so that the ECU 26 estimates the pressure P1 of the working medium on the basis of the transmitted number of revolutions.

The boiler 16 is a heat exchanger that vaporizes a working medium with exhaust heat of exhaust gas, and the exhaust gas, which has been subjected to heat exchange with the boiler 16, is conveyed to the EGR cooler 7. In this exemplary embodiment, there is provided the boiler 16 that exchanges heat with exhaust gas. However, it may be possible to employ a unit that exchanges heat with cooling water. Furthermore, it may be possible that a superheater that exchanges heat with exhaust gas or cooling water is additionally disposed on the downstream side of the boiler 16 and the upstream side of the turbine 17 to superheat the working medium.

The turbine 17 is an expander that is driven with a working medium flowing out from the boiler 16 to output power. In this exemplary embodiment, the turbine 17 is used. However, it may be possible to provide an expander in a form of piston, rotary, scroll, or screw type, in place of the turbine 17.

The condenser 18 is a of heat exchanger that cools a high-temperature and high-pressure working medium discharged from the turbine 17, for example, with water or air, thereby condensing (liquefying) it, and is called a condenser in a Rankine cycle using water.

The steam accumulator 20 is a device that stores steam of the working medium in a state of liquid, and can keep supplying steam with stored latent heat. A known steam accumulator can be used for the steam accumulator 20. However, in the present invention, it is preferable to use a steam accumulator having a structure more suitable for being mounted on a vehicle.

It is preferable to employ, for example, a structure having a unit that prevents the liquid surface from varying such as a baffle plate (anti-splatter plate) and a float (floating plate), or a cell structure having small rooms partitioned therein from the bottom portion of the steam accumulator 20 to the liquid surface, in order to prevent variations in the liquid surface, for example, due to vibration during travel.

Furthermore, in this exemplary embodiment, the steam accumulator 20 is configured to include a heat storage tube 20b encapsulating a heat storage material 20a that melts at temperatures of not less than 80° C. and not more than 150° C., and having both ends closed.

Since this heat storage material 20a melts at temperatures of not less than 80° C. and not more than 150° C., the heat storage material 20a is in a melted state at temperatures more than these temperatures, and can store heat. Since the Rankine cycle 14 according to the present invention works with a low-temperature heat source of 150° C. or lower, it is preferable for the heat storage material 20a to melt at 150° C. or lower, and it is more preferable to use erythritol, which is an artificial sweetener that melts at temperatures of 119° C., and has high safety.

As the heat storage material 20a is encapsulated in the heat storage tube 20b having both ends closed, and the number of heat storage tubes 20b provided is two or more, it is possible to reduce the size (for example, approximately half) with the same heat capacity. Thus, it is possible to suppress an increase in the volume and weight caused by the steam accumulator 20 being mounted, thereby improving mountability to a vehicle. Furthermore, by encapsulating the heat storage material 20a in the heat storage tube 20b, it is possible to prevent imbalance in or flow of the heat storage material 20a.

It should be noted that the steam accumulator 20 has any size determined by considering a capacity that can provide the maximum heat storing performance when the vehicle travels at a normal manner, and an effect of an increase in weight of the device on fuel efficiency. This provides the maximum efficiency in this exemplary embodiment.

The ECU 26 is a control device called an engine control unit, and is a microcontroller in charge of control of the engine 1 through electrical circuits. In the present invention, this ECU 26 includes the normal power output unit C1, the storage unit C2, the leveling unit C3, and the bypass unit C4, and receives vehicle information C5 from various sensors, not illustrated.

The normal power output unit C1 opens the normal power output flow path 22 in the case where power can be outputted by driving the turbine 17 only with the Rankine cycle 14, in other words, only with the working medium from the boiler 16, and closes the normal power output flow path 22 in other cases. More specifically, when the turbine 17 can be driven with the working medium passing through the boiler 16, the normal power output unit C1 opens the first valve V1 to open the normal power output flow path 22, thereby driving the turbine 17 with the working medium flowing out from the boiler 16.

The storage unit C2 opens the storage flow path 23 to store the surplus working medium in the steam accumulator 20 in the case where a surplus working medium, which is a surplus, is generated in the Rankine cycle 14, and closes the storage flow path 23 in other cases. More specifically, when the temperature T1 or pressure P1 of the working medium flowing out from the boiler 16 exceeds a surplus judgment value A at which a surplus working medium, which is a surplus in driving the turbine 17, is generated during the time when the turbine 17 is being driven with the normal power output unit C1, the storage unit C2 opens the second valve V2 to open the storage flow path 23, thereby storing the surplus working medium in the steam accumulator 20.

It should be noted that the surplus judgment value A as used herein can be set to a given value according to form or performance of the turbine 17, or types of working medium. However, the value used is a value obtained in advance on the basis of a relationship between the power that the turbine 17 can output and the temperature T1 and the pressure P1 of the working medium.

The leveling unit C3 opens the leveling flow path 24 in the case where the steam accumulator 20 sufficiently stores the surplus working medium and the turbine 17 cannot output predetermined power only with the working medium from the boiler 16, to discharge the stored surplus working medium to the turbine 17, thereby leveling power outputted by the turbine 17. In other cases, the leveling unit C3 closes the leveling flow path 24.

More specifically, when the working medium does not sufficiently vaporize with the boiler 16 immediately after the engine 1 has started, immediately before the engine 1 stops, or during a low-load operation, in other words, when the temperature T1 or the pressure P1 of the working medium flowing out from the boiler 16 falls below a leveling judgment value B at which the temperature T1 or the pressure P1 is not sufficient for the turbine 17 to output the predetermined power, the leveling unit C3 opens the third valve V3 to open the leveling flow path 24, thereby driving the turbine 17 with the stored surplus working medium.

It should be noted that the leveling judgment value B as used herein can be set to a given value in a similar manner to the surplus judgment value A described above. However, the value used is a value with which the working medium vaporizes with the boiler 16 in advance, and at which the turbine 17 can be driven and can output power. Furthermore, the term "leveling" specifically means that the timing for the turbine 17 to drive is made earlier in the case of immediately after start-up of the engine 1, that the period of time for the turbine 17 to drive is extended in the case of immediately before stop of the engine 1, and that a reduction in output of power from the turbine 17 is suppressed during a low-load operation of the engine 1.

The bypass unit C4 opens the bypass flow path 25 in the case where the working medium cannot vaporize with the boiler 16, or in the case where a difference in pressure between the inlet and the outlet of the turbine 17 becomes large, and the bypass unit C4 causes the working medium that has passed through the boiler 16 to bypass both the turbine 17 and the steam accumulator 20.

More specifically, after the exhaust heat recovery device 13 starts its operation and activates the working medium pump 15 to supply the turbine 17 with the working medium, the bypass unit C4 causes an idling-operation state in which the turbine 17 is stopped, until the space between the boiler 16 and a portion immediately before the turbine 17 is filled with steam of the working medium. Alternatively, the bypass unit C4 eliminates the difference in pressure between the inlet and the outlet of the turbine 17 to prevent the pressure load of the turbine 17 from excessively increasing.

Next, one example of an exhaust heat recovery method using the exhaust heat recovery device 13 described above will be described with reference to FIG. 4 to FIG. 7 and flowcharts in FIG. 2 and FIG. 3.

First, a method of storing the surplus working medium in the steam accumulator 20 illustrated in FIG. 2 will be described. Described below are operations immediately after start-up of the engine 1 on the assumption that the temperature T1 and the pressure P1 of the working medium that has passed through the boiler 16 rise at all times. Furthermore, at the time when the engine 1 starts, the first valve V1, the second valve V2, and the third valve V3 are closed, whereas the fourth valve V4 is opened.

Figure 4:
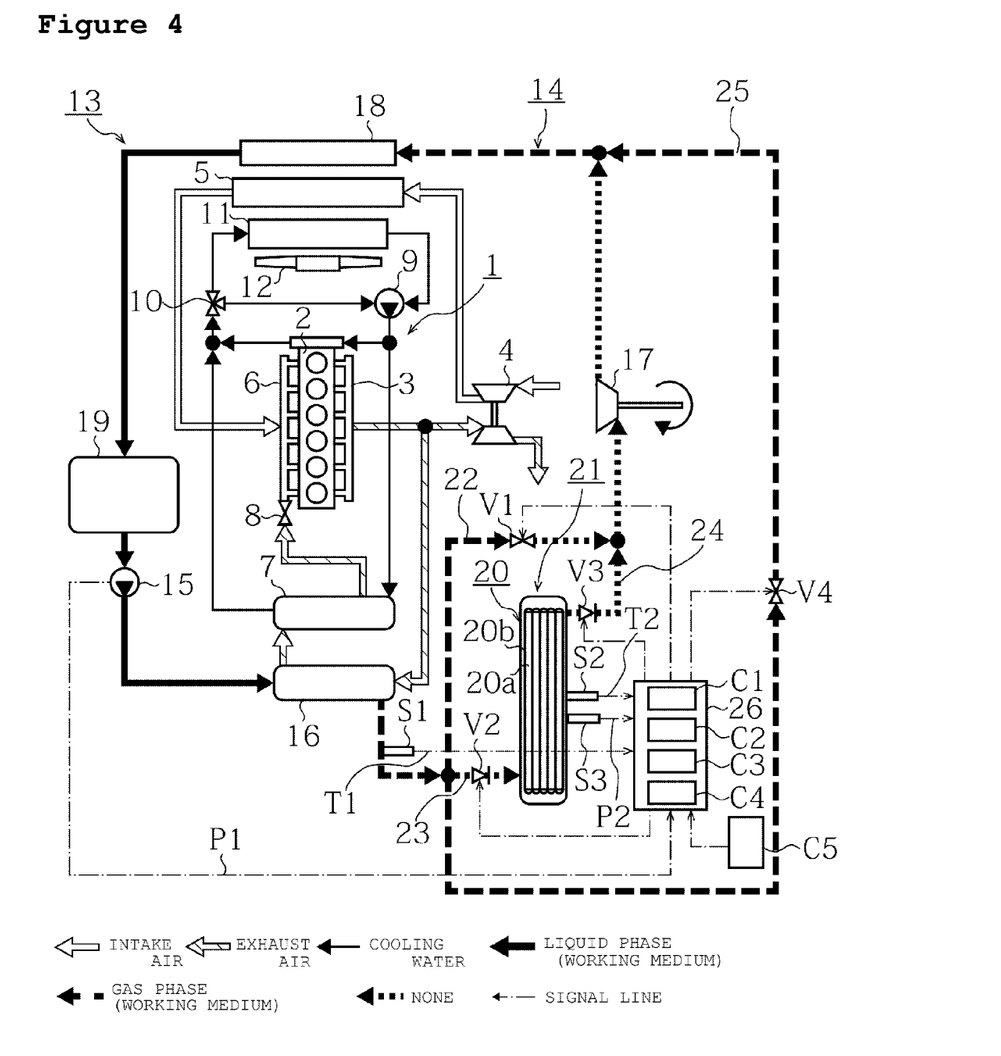
FIG. 4 is a diagram illustrating a configuration of the exhaust heat recovery device for an internal combustion engine according to the first exemplary embodiment of the present invention, and illustrating a state where a bypass flow path is opened, and the working medium bypasses a turbine.

As illustrated in FIG. 4, immediately after start-up of the engine 1, only the fourth valve V4 is opened, and the bypass flow path 25 is opened. This configuration prevents entry, to the turbine 17, of the working medium that is immediately after start-up of the engine 1 and is not sufficiently vaporized with the boiler 16, in other words, the working medium in a liquid phase, or the working medium in a two-phase flow of gas and liquid, which is a mixture of the liquid phase and the gas phase. Thus, it is possible to prevent damage or breakdown of the turbine 17.

Figure 2:
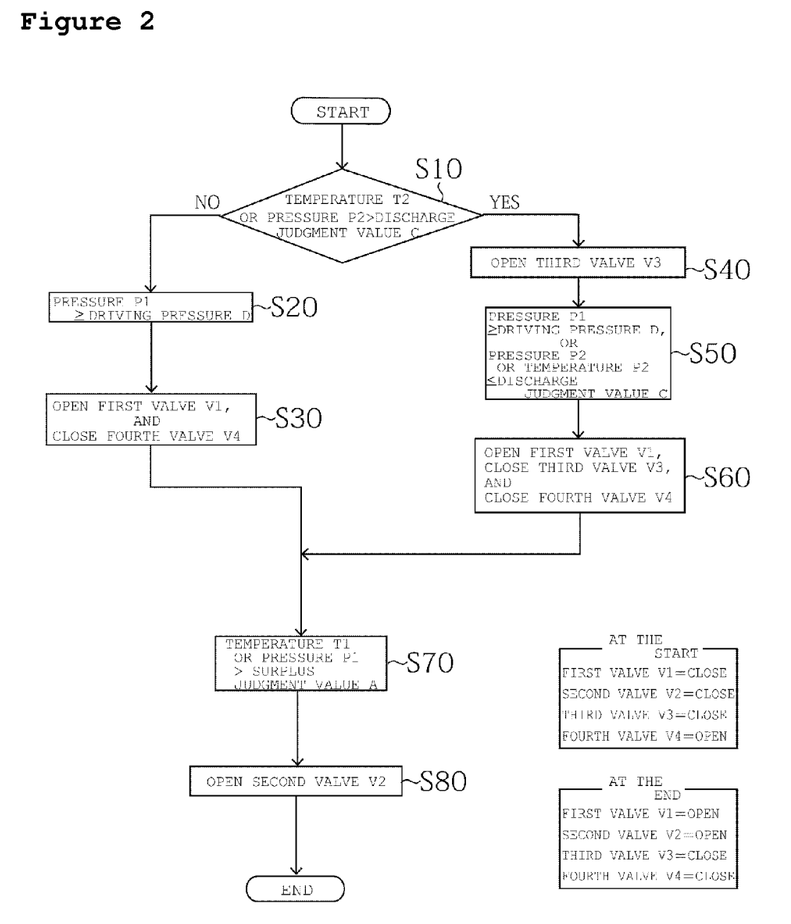
FIG. 2 is a diagram illustrating a part of an exhaust heat recovery method for an internal combustion engine according to the first exemplary embodiment of the present invention, and showing a flowchart of storing a surplus working medium in a steam accumulator.
Figure 3:
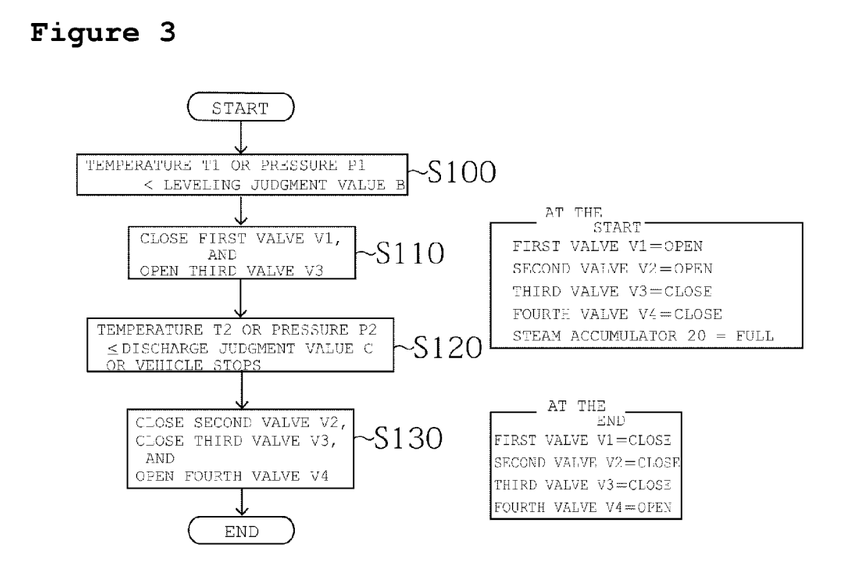
FIG. 3 is a diagram illustrating a part of the exhaust heat recovery method for an internal combustion engine according to the first exemplary embodiment of the present invention, and showing a flowchart of discharging the surplus working medium from the steam accumulator.

Once the engine 1 starts in this state, step S10 of judging whether the temperature T2 or pressure P2 in the steam accumulator 20 is greater than a discharge judgment value C determined in advance is performed as illustrated in FIG. 2.

It should be noted that the discharge judgment value C as used herein represents a value in the case where the surplus working medium is stored in the steam accumulator 20, and this value can be set to a given value according to the capacity of the steam accumulator 20 or types of the heat storage material 20a. In this step S10, it is only necessary that the steam accumulator 20 stores the surplus working medium during the previous operation, and it is judged whether the turbine 17 can be driven with the stored surplus working medium. It may be possible to employ, for example, a configuration of storing a state of the steam accumulator 20 at the time when the engine 1 stopped at the last time.

If it is judged in step S10 that the turbine 17 cannot be driven with the surplus working medium stored in the steam accumulator 20, the state at a time immediately after start-up of the engine 1 illustrated in FIG. 4 is maintained. Then, step S20 of detecting that the pressure P1 of the working medium that has passed through the boiler 16 reaches a driving pressure D with which the turbine 17 can be driven is performed as illustrated in FIG. 2.

It should be noted that the driving pressure D as used herein means a value in the case where the turbine 17 can be driven with the working medium that has passed through the boiler 16, and this value can be set to a given value according to formation or performance of the turbine 17 or types of working medium. In this step S20, it is only necessary to detect a state where the turbine 17 can be driven with the working medium that has passed through the boiler 16. For example, in this step, it may be detected that the temperature T1 and the pressure P2 of the working medium indicate that the working medium fully becomes steam when passing through the boiler 16.

Then, step S30 of opening the first valve V1 and closing the fourth valve V4 is performed. With this step S30, the normal power output flow path 22 is opened, and the turbine 17 is driven, whereby power is outputted, as illustrated in FIG. 1. Furthermore, the fourth valve V4 is opened to open the bypass flow path 25 and the first valve V1 is closed to close the normal power output flow path 22 until the turbine 17 can be driven. With this configuration, the working medium in the liquid phase does not enter the turbine 17, so that it is possible to prevent damage or breakdown of the turbine 17.

Figure 5:
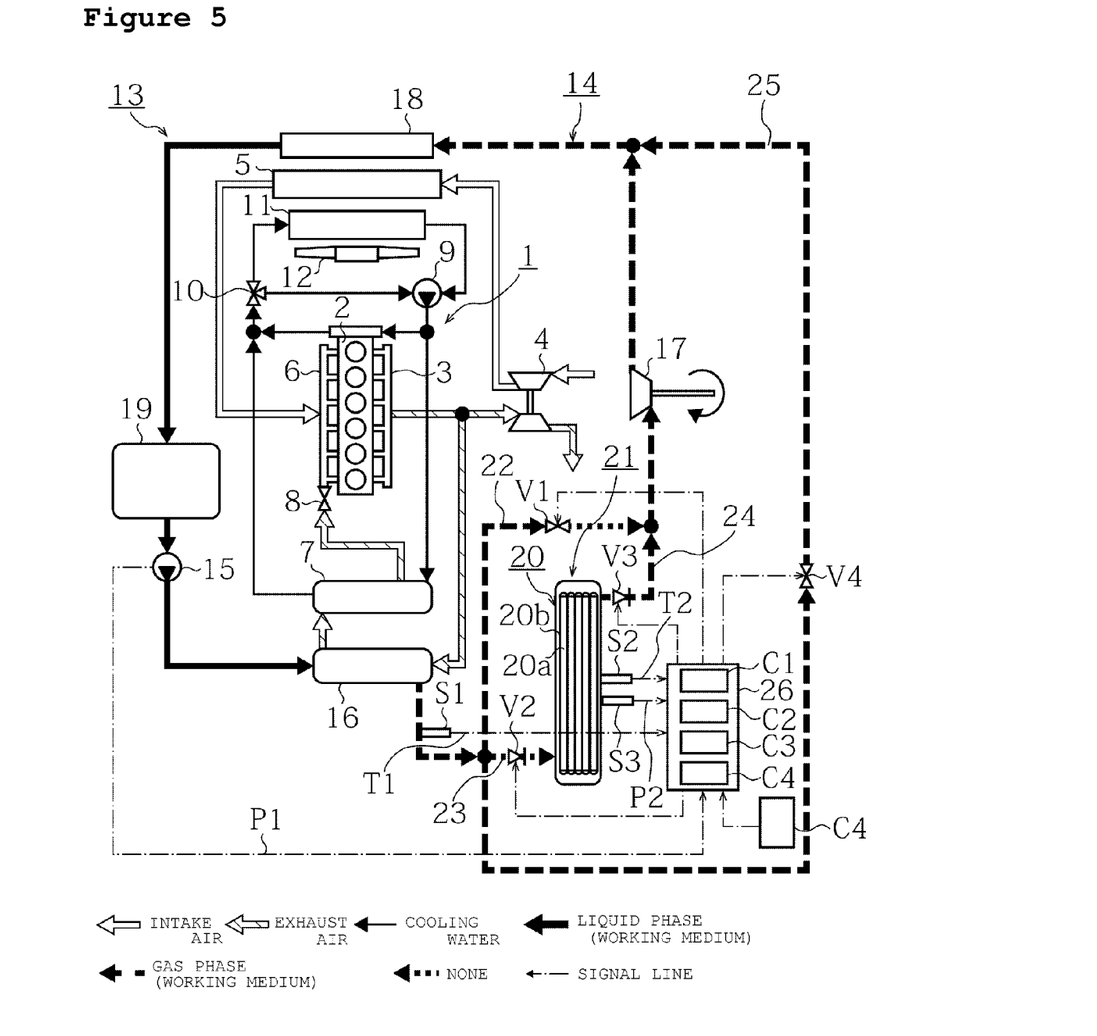
FIG. 5 is a diagram illustrating a configuration of the exhaust heat recovery device for an internal combustion engine according to the first exemplary embodiment of the present invention, and illustrating a state where a leveling flow path is opened, and power is outputted with a surplus working medium stored in the steam accumulator.

If it is judged in step S10 that the turbine 17 can be driven with the surplus working medium stored in the steam accumulator 20, then step S40 of opening the third valve V3 is performed as illustrated in FIG. 2. With this step S40, even in the case where the turbine 17 cannot be driven with the working medium that has passed through the boiler 16 at a time immediately after start-up of the engine 1, the turbine 17 can be driven with the surplus working medium stored in the steam accumulator 20 as illustrated in FIG. 5, and the timing for the turbine 17 to start to drive is made earlier, whereby it is possible to level the output of power.

Next, step S50 of detecting that the pressure P1 of the working medium that has passed through the boiler 16 reaches the driving pressure D with which the turbine 17 can be driven, or detecting that the temperature T2 or the pressure P2 in the steam accumulator 20 becomes a discharge judgment value C or lower is performed as illustrated in FIG. 2. Then, step S60 of opening the first valve V1, closing the third valve V3, and closing the fourth valve V4 is performed.

Figure 6:
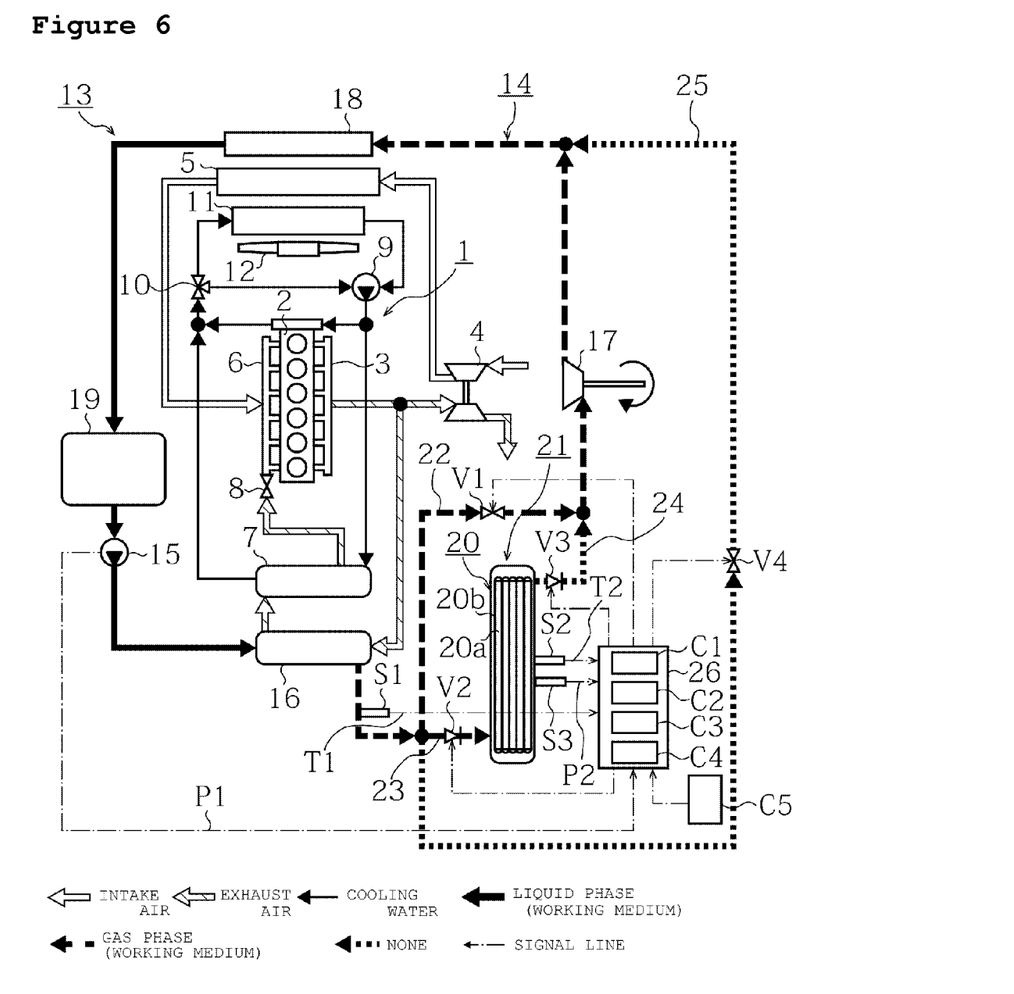
FIG. 6 is a diagram illustrating a configuration of the exhaust heat recovery device for an internal combustion engine according to the first exemplary embodiment of the present invention, and illustrating a state where a storage flow path is opened, and a surplus working medium is stored in the steam accumulator.

Next, step S70 of detecting that the temperature T1 or pressure P1 of the working medium that has passed through the boiler 16 exceeds the surplus judgment value A is performed. Then, step S80 of opening the second valve V2 is performed. With this step S80, the surplus working medium, which is a surplus in driving the turbine 17, is stored in the steam accumulator 20 as illustrated in FIG. 6. With this configuration, the power is outputted from the turbine 17, and at the same time, the surplus working medium is stored in the steam accumulator 20, whereby it is possible to use exhaust heat energy of the engine 1 without causing any waste.

Although not illustrated, if the difference in pressure between the inlet and the outlet of the turbine 17 becomes large after step S80, the fourth valve V4 is opened to cause part of the working medium, which has passed through the boiler 16 and vaporized, to be bypassed using the bypass flow path 25, whereby it is possible to reduce the load of the turbine 17, and eliminate the difference in pressure between the inlet and the outlet of the turbine 17.

In addition to opening of the bypass flow path 25, it may be possible to control the pump flow rate of the working medium pump 15. For example, in the case where the working medium is maintained in a gas phase at a temperature of 120° C. and a pressure of 5 MPa, and working conditions for the working medium, lubricant, or the like are set such that the maximum temperature is 150° C. and the maximum pressure is 9 MPa (the maximum values at which thermal decomposition or other phenomena occur), it is preferable to control the pump flow rate of the working medium pump 15 or opening/closing of the bypass flow path 25 so that the working conditions are satisfied and the gas phase is maintained.

A method of discharging the surplus working medium stored in the steam accumulator 20 illustrated in FIG. 3 will be described. Described below are operations immediately before stop of the engine 1 on the assumption that the temperature T1 and the pressure P1 of the working medium that has passed through the boiler 16 decrease at all times. Furthermore, the first valve V1 and the second valve V2 are opened, and the third valve V3 and the fourth valve V4 are closed.

First, step S100 of detecting that the temperature T1 or pressure P1 of the working medium that has passed through the boiler 16 falls below the leveling judgment value B is performed. Then, step S110 of closing the first valve V1 and opening the third valve V3 is performed.

Figure 7:
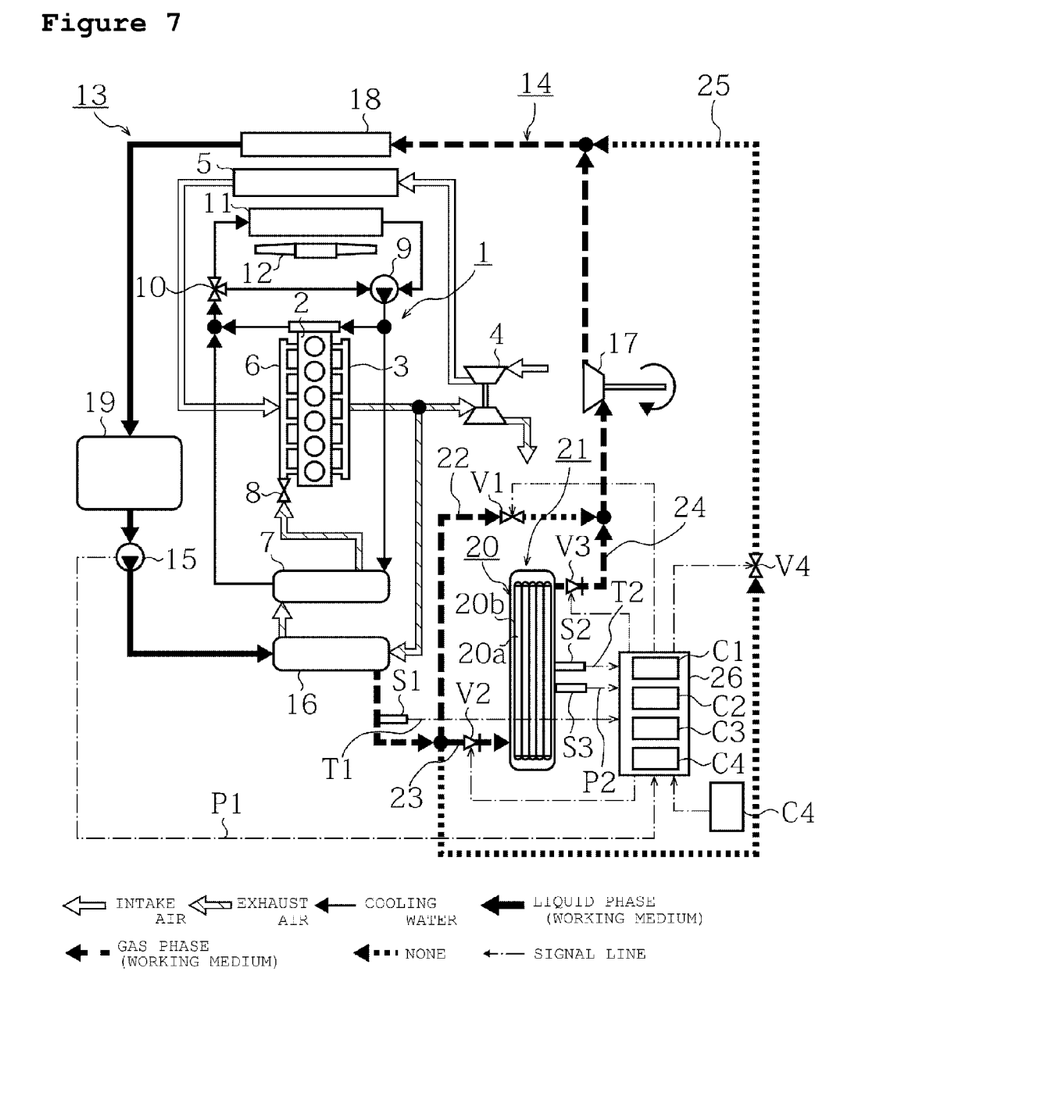
FIG. 7 is a diagram illustrating a configuration of the exhaust heat recovery device for an internal combustion engine according to the first exemplary embodiment of the present invention, and illustrating a state where the leveling flow path is opened, and power is outputted with a surplus working medium stored in the steam accumulator.

With this step S110, when the turbine 17 cannot be driven only with the working medium that has passed through the boiler 16 at a time immediately before stop of the engine 1 or during a low-load operation of the engine 1, or when the turbine 17 cannot output predetermined power only with the working medium that has passed through the boiler 16, the surplus working medium stored in the steam accumulator 20 is discharged to drive the turbine 17, and the period of time for the turbine 17 to drive is extended, thereby preventing a reduction in output of power at a time immediately before stop of the engine 1 or during a low-load operation of the engine 1 as illustrated in FIG. 7. With these operations, it is possible to level the power outputted from the turbine 17.

It should be noted that, although the first valve V1 is closed in step S110 of this exemplary embodiment, it may be possible to open the first valve V1 to open the normal power output flow path 22, provided that the working medium in the liquid phase does not enter the turbine 17. However, it is preferable to employ a configuration in which the working medium passes through only the steam accumulator 20 because the amount of flow of the working medium can be reduced and pressure can be maintained.

Next, step S120 of detecting that the temperature T2 or pressure P2 in the steam accumulator 20 becomes the discharge judgment value C or lower, or detecting on the basis of the vehicle information C5 that the vehicle stops is performed. Then, step S130 of closing the second valve V2 and the third valve V3 and opening the fourth valve V4 is performed.

According to the method described above, the surplus working medium is discharged from the steam accumulator 20 to drive the turbine 17 even in the case where the working medium does not sufficiently vaporize with the boiler 16, for example, at a time immediately after start-up, immediately before stop, or during a low-load operation of the engine 1. With this configuration, a reduction in power is prevented and the power outputted from the turbine 17 is leveled. Thus, it is possible to efficiently use exhaust heat from the engine 1. Furthermore, by using the leveled power to drive the engine 1, it is possible to improve fuel efficiency.

Figure 8:
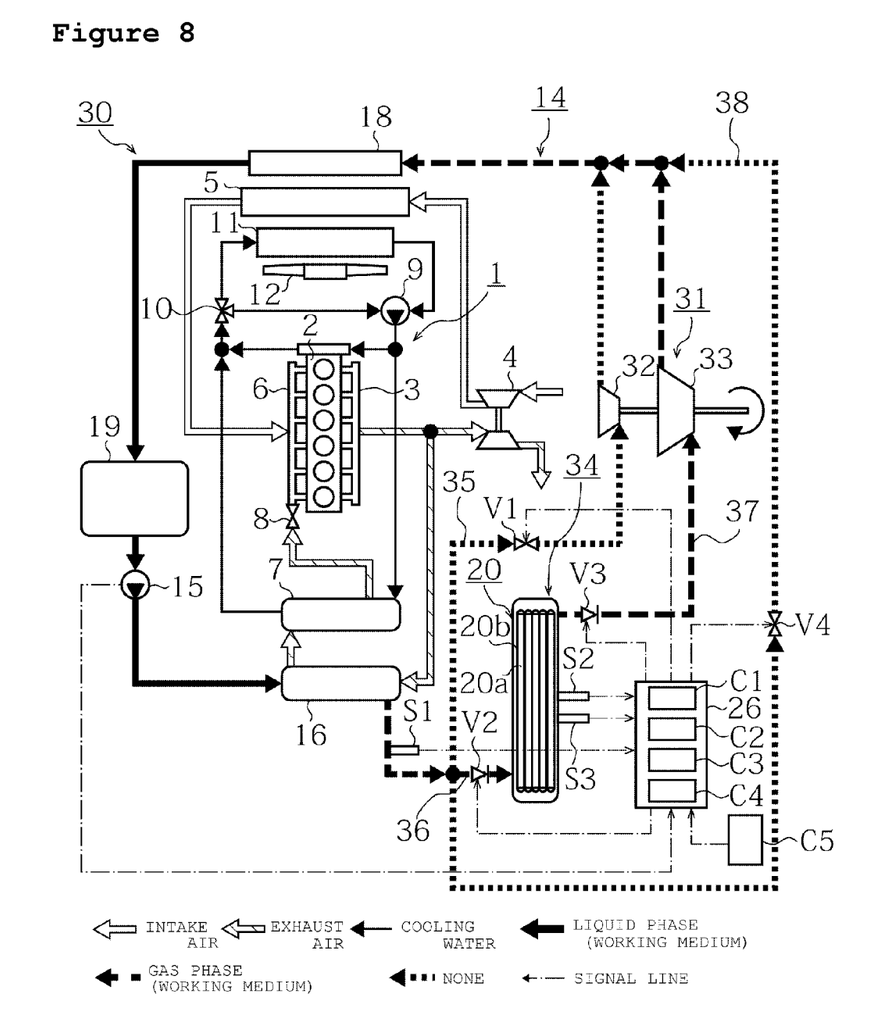
FIG. 8 is a diagram illustrating a configuration of an exhaust heat recovery device for an internal combustion engine according to a second exemplary embodiment of the present invention, and illustrating a state where a leveling flow path is opened, and power is outputted with a surplus working medium stored in a steam accumulator.

Next, an exhaust heat recovery device 30 for an internal combustion engine according to a second exemplary embodiment of the present invention will be described with reference to FIG. 8. This exhaust heat recovery device 30 includes a high/low-pressure two-system turbine (expander) 31 in place of the turbine 17 of the Rankine cycle 14 of the exhaust heat recovery device 13 according to the first exemplary embodiment. This high/low pressure two-system turbine 31 includes a high-pressure turbine 32 that drives with a high-pressure working medium flowing out from the boiler 16, and a low-pressure turbine 33 that drives with a low-pressure surplus working medium stored in the steam accumulator 20.

Furthermore, this exhaust heat recovery device 30 includes a leveling line 34 that causes the steam accumulator 20 to store the surplus working medium, which is a surplus of the working medium for driving the high-pressure turbine 32, and discharges the stored surplus working medium from the steam accumulator 20 to the low-pressure turbine 33 when the high-pressure turbine 32 cannot output predetermined power, thereby leveling power outputted from the high/low pressure two-system turbine 31.

Furthermore, the exhaust heat recovery device 30 includes a normal power output flow path 35 that guides the high-pressure working medium flowing out from the boiler 16 to the high-pressure turbine 32, a storage flow path 36 that guides the working medium flowing out from the boiler 16 to the steam accumulator 20, a leveling flow path 37 that guides the low-pressure surplus working medium flowing out from the steam accumulator 20 to the low-pressure turbine 33, and a bypass flow path 38 that causes the working medium flowing out from the boiler 16 to bypass both the high/low pressure two-system turbine 31 and the steam accumulator 20 to guide the working medium to the condenser 18. In addition, the exhaust heat recovery device 30 includes an ECU 26 having the normal power output unit C1, the storage unit C2, the leveling unit C3, and the bypass unit C4.

With this configuration, a period of time for the high/low pressure two-system turbine 31 to operate is extended with the Rankine cycle 14 and the leveling line 34 having the steam accumulator 20, whereby it is possible to level the output of power from the high/low pressure two-system turbine 31. Thus, the exhaust heat from the engine 1 is effectively used, and power outputted is used to drive the engine 1, whereby it is possible to significantly improve fuel efficiency.

With the exhaust heat recovery device for an internal combustion engine according to the present invention, it is possible to level the power outputted from the expander without reduction of the power even in the case where the evaporator cannot vaporize the working medium, for example, immediately after start-up, immediately before stop, or during a low-load operation of the internal combustion engine, whereby it is possible to efficiently use exhaust heat from the internal combustion engine. Thus, the exhaust heat recovery device for an internal combustion engine according to the present invention can be used especially for a truck having a diesel engine mounted thereon or other vehicles, and improve fuel efficiency.

The invention claimed is:

1. An exhaust heat recovery device for an internal combustion engine having a Rankine cycle comprising:
   a pump that pressure-feeds a working medium;
   an evaporator that vaporizes the working medium with exhaust heat from the internal combustion engine;
   an expander that is driven with the working medium flowing out from the evaporator, and outputs power;
   a condenser that liquefies the working medium flowing out from the expander;
   a steam accumulator that stores a surplus working medium, which is a surplus of the working medium for driving the expander;
   a valve in a leveling flow path for the surplus working medium between the steam accumulator and the expander that opens and closes the leveling flow path;
   a sensor that detects at least one of a temperature and a pressure of the working medium flowing out from the evaporator; and
   an electronic controller configured to:
      open the valve in the leveling flow path to discharge the stored surplus working medium from the steam accumulator to the expander based on the temperature detected by the sensor when the expander does not output predetermined power with only the working medium flowing out from the evaporator, after the engine is started, immediately before the engine stops, or during a low-load operation; and
      level the power outputted from the expander.

2. The exhaust heat recovery device for an internal combustion engine according to claim 1, further comprising:
   a normal power output flow path that guides, to the expander, the working medium flowing out from the evaporator; and
   a storage flow path that guides, to the steam accumulator, the working medium flowing out from the evaporator;
   wherein the controller is further configured to;
      open a second valve in the storage flow path to store the surplus working medium in the steam accumulator when, after a third valve in the normal power output flow path s opened and the expander is driven with the working medium flowing out from the evaporator, the at least one of temperature and the pressure of the working medium flowing out from the evaporator exceeds a surplus judgment value at which the surplus working medium is generated, and
      open the valve in the leveling flow path to discharge the surplus working medium stored in the steam accumulator to the expander, and level the power outputted from the expander when the pressure of the working medium flowing out from the evaporator falls below a leveling judgment value at which the expander does not output predetermined power with only the working medium flowing out from the expander.

3. The exhaust heat recovery device for an internal combustion engine according to claim 1, wherein the steam accumulator includes a heat storage tube encapsulating a heat storage material that melts at a temperature of not less than 80° C. and not more than 150° C., and having both ends closed.

4. An exhaust heat recovery method for an internal combustion engine using a Rankine cycle comprising:
   pressure feeding a working medium with a pump
   vaporizing the working medium in an evaporator with exhaust heat from the internal combustion engine;
   driving an expander with the working medium flowing out from the evaporator, and outputting power;
   liquefying the working medium flowing out from the expander in a condenser;
   storing a surplus working medium, which is a surplus of the working medium for driving the expander, in a steam accumulator;
   opening and closing a leveling flow path for the surplus working medium between the steam accumulator and the expander with a valve;
   detecting at least one of a temperature and a pressure of the working medium flowing out from the evaporator with a sensor;
   opening the valve in the leveling flow path with an electronic controller and discharging the stored surplus working medium from the steam accumulator to the expander based on the temperature detected by the sensor when the expander does not output predetermined power with only the working medium flowing out from the evaporator, immediately after the engine is started, immediately before the engine stops, or during a low-load operation; and
   leveling the power outputted from the expander.

5. The exhaust heat recovery method for an internal combustion engine according to claim 4, further comprising:
   opening a second valve in a storage flow path that guides the working medium flowing out from the evaporator to the steam accumulator to store the surplus working medium in the steam accumulator when, after a third valve in a normal power output flow path that guides the working medium flowing out from the evaporator to the expander is opened and the expander is driven with the working medium flowing out from the evaporator, the at least one of the temperature and the pressure of the working medium flowing out from the evaporator exceeds a surplus judgment value at which the surplus working medium is generated, and opening the valve in the leveling flow path that guides the working medium flowing out from the steam accumulator to the expander to discharge the stored surplus working medium from the steam accumulator to the expander, and leveling the power outputted from the expander when the pressure of the working medium flowing out from the evaporator falls below a leveling judgment value at which the expander does not output predetermined power with only the working medium flowing out from the expander.

6. The exhaust heat recovery device for an internal combustion engine according to claim 2, wherein the steam accumulator includes a heat storage tube encapsulating a heat storage material that melts at a temperature of not less than 80° C. not more than 150° C., and having both ends closed.

* * * * *